United States Patent [19]

Daniell

[11] Patent Number: 4,535,900
[45] Date of Patent: Aug. 20, 1985

[54] TRANSFER APPARATUS AND METHOD

[75] Inventor: Alan F. Daniell, Stafford, Tex.

[73] Assignee: Fluor Corporation, Irvine, Calif.

[21] Appl. No.: 488,240

[22] Filed: Apr. 25, 1983

[51] Int. Cl.³ .............................................. B66C 23/00
[52] U.S. Cl. .................................... 212/193; 212/199;
212/235; 212/239; 212/262; 212/270
[58] Field of Search ................ 212/232, 235, 236–239,
212/255, 256, 260, 262, 192, 193, 218, 199;
414/144, 145

[56] References Cited

U.S. PATENT DOCUMENTS

| | | | |
|---|---|---|---|
| 625,085 | 5/1899 | Conley | 414/144 |
| 1,131,518 | 3/1915 | Hodgman | 212/235 |
| 3,107,790 | 10/1963 | Lehmann | 212/193 |
| 3,339,707 | 9/1967 | Ludwig | 212/262 |

FOREIGN PATENT DOCUMENTS

| | | | |
|---|---|---|---|
| 244580 | 5/1969 | U.S.S.R. | 212/218 |
| 307045 | 6/1971 | U.S.S.R. | 212/255 |

Primary Examiner—Trygve M. Blix
Assistant Examiner—Stephen P. Avila
Attorney, Agent, or Firm—Lyon & Lyon

[57] ABSTRACT

A transfer apparatus and method utilizing a boom having complete spatial freedom. The boom is supported by a series of ropes and may be moved in any of three mutually parallel planes so as to transfer material in any desired manner, as by utilizing a conveyor system or a lifting rope.

16 Claims, 13 Drawing Figures

TRANSFER APPARATUS AND METHOD

This invention relates to transfer apparatus and method and more particularly to transfer apparatus and method utilizing a boom.

The booms of transfer apparatus of conventional design have not been capable of moving in three mutually perpendicular planes to give complete spatial freedom. For instance, the conventional lifting device has one end of the boom carried on a one-axis or two-axis pivot.

A sheerleg employs a one-axis pivot and is relatively inexpensive in initial costs, but is slow and inconvenient in use because of the lack of slewing capability.

An example of a boom movable in two mutually parallel planes is the conventional crane which is more expensive than the sheerlegs in initial cost, but has slewing capability.

Both of these types of equipment are utilized for handling loads offshore and are commonly installed on barges to transfer loads between barges and an offshore platform. The equipment is also utilized in construction of the platform.

When so used, a sheerleg is seriously limited in that transfer of a module from a barge to the offshore structure is accomplished by lateral movement of the sheerleg barge in its mooring.

When the conventional revolving crane is utilized, it is capable of slewing the load, but is limited in reach.

One problem with both devices is floating stability, and wave induced motions when operating. Stability has two aspects. When in transit between locations, the rig must have adequate stability to survive severe ocean storms. Both the sheerlegs and the revolving crane (even if the boom of the latter is stored horizontally during transit) necessarily have considerable weight at a height above the barge deck. The barge must therefore be adequately sized to meet the survival conditions. Secondly, when operating, either type of rig when lifting loads at short radius will have the outer end of the boom, at which point the load is supported, at a high elevation. In calculating floating stability, a freely suspended load must be considered as acting at the point of suspension. Thus, when lifting a heavy load at short radius with the boom luffed up, large de-stabilizing effects are generated.

During a lifting operation wave induced motions of the barge will cause swaying of the suspended load, and to insure that these motions are within safe and operationally acceptable limits, lifting operations must be suspended when wave conditions exceed certain criteria of height and period. Again, the short radius lift with boom luffed up is critical, since the roll motion of the barge translates into large lateral movements at the elevation of the top of the boom. The situation is made worse if the pendulum constituted by the load suspended from the boom should have a period in synchronism with the wave induced roll of the barge.

Another well known type of transfer apparatus is that used in material loading of ships.

One type of material loader employs a travelling gantry which runs the length of the dock, and supports a cantilever arm which can be racked in and out in the transverse direction.

Another well known material loader is known as a radial loader which rotates on fixed pivots with a separate quadrant-shaped support track, and carries telescoping cantilevers. Practical size limitations require two radial loaders to cover a ship of about one hundred thousand dead weight tons.

Both the travelling loader and the radial loader require large and costly mechanisms. In addition both require extensive piled foundations to carry the support tracks.

It is an object of this invention to provide a transfer apparatus and method with a boom having complete spatial freedom.

Another object is to provide a transfer apparatus and method with a boom which may be moved in three mutually perpendicular planes.

Another object is to provide a transfer apparatus and method in which a boom is supported and positioned by a plurality of ropes in which the boom has complete spatial freedom.

Another object is to provide a transfer apparatus and method for a boat or barge in which the boom is supported by ropes for complete spatial freedom and may be laid down on the barge for transport and the support for the boom is pivoted to the barge and may be readily erected for use and laid down for transport.

Another object is to provide a transfer apparatus and method for transferring material in which a boom having complete spatial freedom supports a conveyor system for receiving material from a fixed conveyor system.

Another object is to provide a transfer apparatus and method with a boom which can be positioned at any desired outreach and elevation.

Another object is to provide a transfer system and method for handling material having a lighter superstructure, much less mechanism, and requiring a smaller foundation than those devices and methods presently in use.

Other objects, features and advantages of this invention will be apparent from the drawings, the specification and the claims.

In the drawings wherein illustrative embodiments of this invention are shown and wherein like parts are indicated by like reference numerals:

In practicing the method of this invention a support means of any desired design is provided. A material handling boom is supported from the support means and is controlled by paying out and taking in a plurality of ropes. The boom has complete spatial freedom and is movable in three mutually perpendicular planes.

In one preferred form the boom is suspended from the support means by a double bridle and a single line to an anchor point. In another preferred form the boom is supported from the support means by a pair of ropes and four ropes extend to spaced anchor points. Any desired arrangement of ropes may be utilized to support and control movement of the boom.

Figure 1:
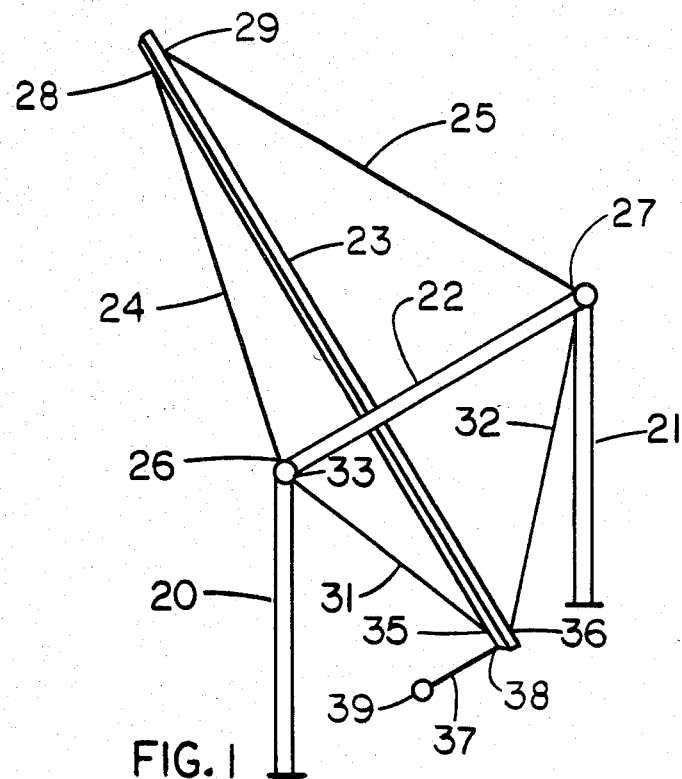
FIG. 1 is a schematic illustration of a transfer apparatus constructed in accordance with this invention.

Referring first to FIG. 1, an elevated support means is provided by a pair of legs 20 and 21 interconnected at their upper ends by crossbar 22. A boom 23 is supported by the elevated support means and such boom may be utilized for any transfer purpose, such as to lift equipment or to support a conveyor to convey materials, as will appear more fully hereinafter.

In the FIG. 1 form a pair of ropes 24 and 25 extend between spaced points 26 and 27 on said support means and points 28 and 29, respectively, adjacent one end of said boom.

The term ropes as used herein means tension members of any desired form. Flexible tension members such as wire rope, chains, etc., are preferred.

A second pair of ropes 31 and 32 extend between spaced points 33 and 34, respectively, on said support and points 35 and 36, respectively, on said boom 23.

In the particular form of the invention illustrated in FIG. 1, the ropes 24, 25, 31 and 32 both suspend the boom from the support means and by reeling in or out the ropes by take up means, not shown, control the movement of the boom 23 longitudinally and slewing of the boom, as well as the elevation of the boom.

A fifth rope 37 extends between the boom at point 38 and an anchor point 39. Preferably the anchor point is at the foundation level, as shown, and approximately midway between the legs 20 and 21. Taking up or letting out the rope 37 controls luffing of the boom in the vertical plane. While the anchor point 39 is at the base of the elevated support means, it will be appreciated that the anchor point 39 could be at an elevated point. Preferably, the line 37 is attached to the end of the boom 23 which normally is closest to the elevated support means, but it will be appreciated that it could be attached to the end of the boom more remote from the elevated support means if the anchor point 39 were at an elevated position relative to the boom and preferably above the elevated support means. For instance, a standard could be applied to cross-member 22 and the anchor point 39 could be carried by this standard and attached to the end of the boom remote from the cross-member 22 to control luffing of the boom. Of course, the line 37 could extend from the remote end of the boom to any point above the boom, such as to the cross-arm 22, if desired, but it would be preferred to extend a standard upwardly from the cross-arm 22 at approximately its midpoint and train the line controlling luffing over such standard to control the outer end of the boom in a manner comparable to the control of the outer end of a crane boom.

Figure 2A:
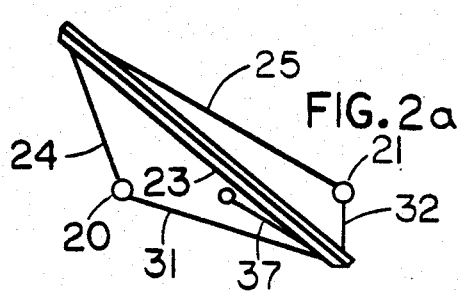
FIGS. 2A and 2B are plan views illustrating different positions of the boom of the transfer apparatus.
Figure 2B:
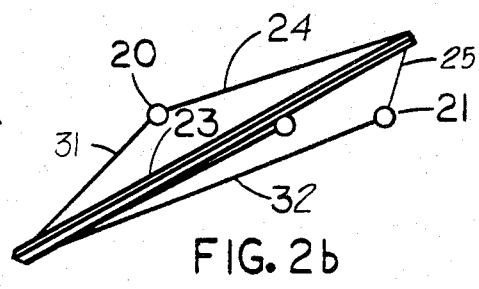

FIGS. 2A and 2B show the action of the boom being shrewed to the left in FIG. 2A and to the right in FIG. 2B. Considering first FIG. 2A, ropes 24 and 32 have been taken in and ropes 25 and 31 let out to cause the boom 23 to slew to the left. To maintain the same luffing position, the rope 37 would have also been let out as illustrated. The contrary rope handling is illustrated in FIG. 2B in which in carrying out the slewing action the ropes 32 and 24 have been taken up. Here, however, not only has the boom 23 been slewed to the right, but it has also been moved rearwardly to illustrate also the capability of controlling the ropes to both slew and move the boom 23 along its longitudinal axis.

Figure 3A:
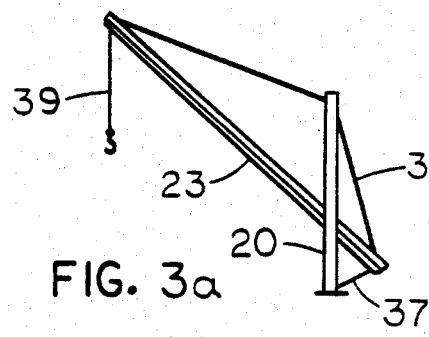
FIGS. 3A and 3B are elevational views illustrating different positions of the boom of the transfer apparatus.
Figure 3B:
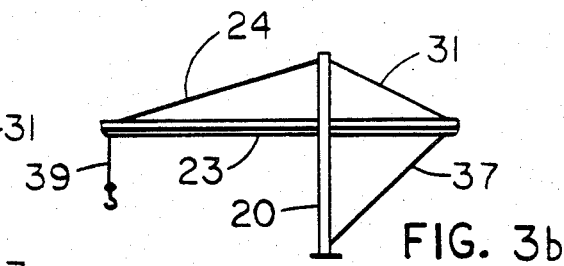

In FIGS. 3A and 3B the luffing function is illustrated and in this instance it will be noted that in FIG. 3A the rope 37 has been taken in to elevate the working end of the boom 23 which is shown to carry a load line 39 on its extended end.

In FIG. 3B the luffing line 37 has been let out to position the boom 23 in a horizontal plane.

A consideration of FIG. 3B will clearly indicate how the two pairs of rope 24, 25, 31, 32 might be simultaneously taken in or let out to raise or lower the boom 23 while maintaining it in a horizontal plane by simultaneously taking in or letting out the luffing line 37.

Figure 4:
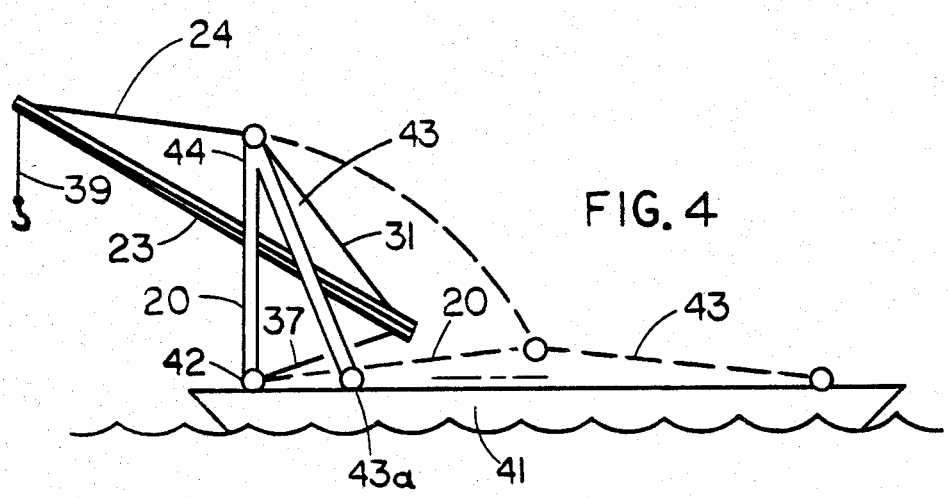
FIG. 4 is a side elevational schematic view illustrating the invention supported on a barge and indicating in dashed lines the laid down position of the support means of the apparatus.

In FIG. 4 the transfer apparatus of FIG. 1 is shown mounted on a work barge 41. The leg 20 of the support means is pivoted to the work barge 41 at 42. The other leg 21 of the support means, not shown, would also be pivoted to the work barge.

A bracing leg 43 is pivoted at 44 to the upper end of leg 20 and a like leg would also be pivoted to the upper end of the leg 21.

While not shown, the lower ends of leg 43 and its companion leg would be releasably attached to the lay barge 41 to fix the support means in elevated position, as shown in FIG. 4, so that the boom 23 might extend from the barge in the manner shown and the hoisting line 39 be utilized to transfer material.

As discussed above, it is highly desirable to lower the center of gravity of equipment on the barge 41 during transport. For this reason the lower end 43a of the legs 43 are extendable along a track, not shown, to position the legs 20 and 43 in the dotted line position of FIG. 4 for transport. Of course, the boom 23 would have previously been laid down on the barge and thus the center of gravity of the transfer apparatus would be very low and the effect of this equipment on the seaworthiness of the barge during heavy weather would be minimized.

Figure 6:
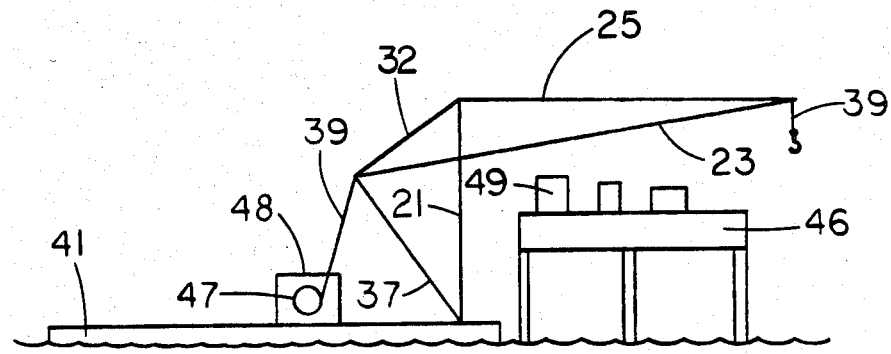
FIG. 6 is a view in side elevation of the transfer apparatus of this invention mounted on a barge and positioned to transfer material to an offshore platform.
Figure 7:
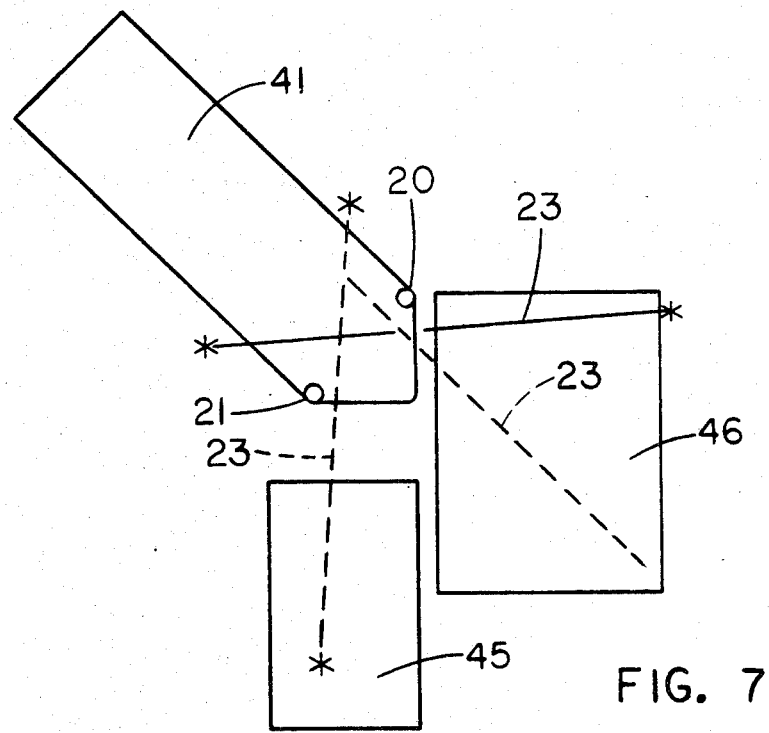
FIG. 7 is a schematic plan view illustrating the reach and slewing ability of the apparatus shown in FIG. 6.

FIGS. 6 and 7 illustrate use of the transfer apparatus offshore. For clarity the bracing legs 43 have been omitted from FIGS. 6 and 7. In the alternative, the elevated support means might be as shown in FIG. 1 in which massive legs would be self bracing or be guyed to the barge 41.

In FIGS. 6 and 7 the barge 41 is shown adjacent to a supply barge 45 and an offshore platform 46. The hoisting line 39 extends along the boom 23 and downwardly from the rear end of the boom, as viewed in FIG. 6, to the drum 47 of drawworks 48. FIG. 6 illustrates that a major portion of the boom 23 may be extended out over the platform to provide maximum reach capabilities. A boom of the same length pivoted in the conventional manner of a crane at the same point at which leg 21 is pivoted to the barge 41 would reach a little beyond the midpoint of the platform. Thus, this invention provides substantially greater boom reach than would a comparable length boom pivoted at its lower end to the barge in the usual manner. It is further pointed out that the height of the boom at its load carrying end is much lower in elevation than would be a conventional boom handling the load represented by the square 49. To handle the equipment 49 a conventional boom would have to be luffed to its maximum elevation with the disadvantages discussed hereinabove.

FIG. 7 illustrates the boom 23 being retracted to position the material handling end at one point over the platform. The boom 23 is shown in dashed lines to be swung from its solid line position to a position overlying the equipment barge 45, illustrating the slewing action of the boom. Also in dashed lines extending over the platform 46 the boom is illustrated to have been extended toward the platform for maximum reach.

Figure 5:
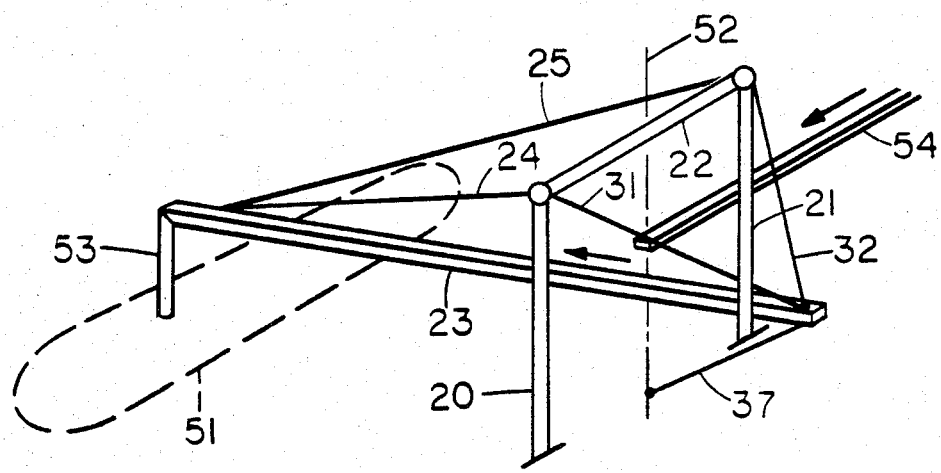
FIG. 5 is a schematic illustration of the invention transferring material as from land to the hold of a ship.

In FIG. 5 the invention is illustrated conveying material from shore to a ship, indicated at dashed lines at 51. In this use of the invention the boom 23 would be maintained in a substantially horizontal position and would be cause to slew about the centerline 52 by appropriate taking in and letting out of the several ropes to swing the chute 53 depending from the boom 23 over the cargo vessel indicated at 51. By controlling movement of the boom along its longitudinal axis during slewing of the boom the chute 53 may be maintained in the proper position to discharge cargo into a vessel. The boom would be provided with a conveyor for receiving material to be loaded from the shore side conveyor 54, such material falling from the shore side conveyor 54 onto the conveyor on boom 23 and thence being discharged through chute 53 into the cargo vessel.

Figure 8:
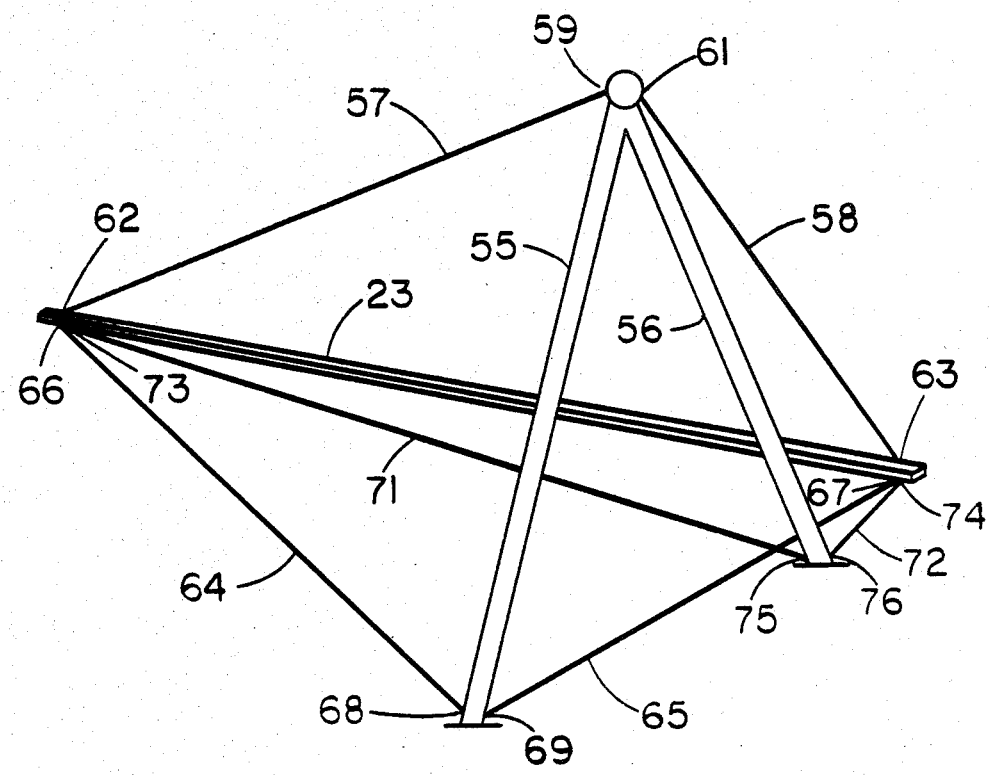
FIG. 8 illustrates a form of this invention utilizing a different rope scheme.

Reference is now made to FIG. 8 wherein a different arrangement of supporting and controlling ropes is illustrated. The elevated support means is also of different form but could take any form desired.

In FIG. 8 the elevated support means is provided by legs 55 and 56 which are joined together at the upper end. In this form of the invention a pair of ropes 57 and 58 extend between points 59 and 61 on the support means and a first point 62 on the boom 23 and a second point 63 on the boom 23, respectively. The points 62 and 63 are spaced longitudinally along the boom. The pair of ropes 57, 58 suspend the boom 23.

A second pair of ropes 64 and 65 extend between a first point 66 on the boom and a second longitudinally spaced point 67 on said boom and anchor points 68 and 69, respectively. The anchor points are positioned laterally to one side of a plane passing through the first pair of ropes 57 and 58 at their point of attachment 59 and 61 to the support means. Preferably, the anchor points 68 and 69 are adjacent to the leg 55 of the support means, as shown.

A third pair of ropes 71 and 72 in like manner extend between third point 73 and fourth point 74 on said boom and anchor points 75 and 76, respectively. The anchor points 75 and 76 are spaced to the other side of said vertical plane passing through attachment points 59 and 61 for the ropes 57 and 58. Again, the attachment points on the boom are spaced longitudinally along the boom. Preferably, as shown, the attachment points 66 and 73 are adjacent each other, as are the attachment points 67 and 74.

By suitably taking in and letting out the lines 64, 65, 71 and 72, the boom 23 may be slewed around the support points 59 and 61 and luffed, as desired. Coordinated handling of ropes 57 and 58 will control the elevation and axial movement of boom 23. The rope scheme illustrated in FIG. 8 may be utilized in any material handling or transfer arrangement, such as those shown in FIGS. 4 and 5. It is further obvious that if desired the rope schemes of FIG. 1 and FIG. 8 might be combined as for instance instead of a single luffing rope 37 a pair of luffing ropes trained as are ropes 65 and 72 of FIG. 8 might be utilized for luffing the boom.

In control of the apparatus a desired movement of the outer end of the boom may require simultaneous adjustment of the lengths of the five controlling ropes of the FIG. 1 design, or the six controlling ropes of the FIG. 8 design.

In practice each of the ropes may consist of a multiple sheave assembly controlled by a separate deck mounted winch.

Frequently in the case of the derrick barge and normally in the case of the ship loader, it is desired to move the load in the horizontal plane without raising or lowering it. Under these conditions, the potential energy of the system remains constant, so that the net work input required is solely that necessary to cover the friction losses in the system.

However, in the course of such a movement, any individual winch may be required to haul in or pay out rope under tension, so that that particular winch will absorb, or generate, a substantial quantity of work. For this reason, and also to avoid the problems which would arise in dissipating energy and friction brakes when a winch pays out under tension, it is desirable to connect the whole complex of winches to a regenerative power system. Such a system could be electrical, or could employ a hydrostatic power transmission system.

The transfer device has unlimited freedom, and in general there will be an infinite number of different paths by which the desired motion can be achieved. One of these paths will be an optimum in meeting some desired criteria, such as minimum elapsed time or minimum energy consumption. Further, there may be constraints, such as the need to maintain adequate clearance from obstructions, or to avoid excessive loads on ropes.

Proper operation of the winch controls to meet these requirements would make excessive demands on the skill and judgment of an operator. Therefore, a control system is provided with suitable sensors and logic capabilities, to act as an interface between the commands of the operator and the physical movements of the device.

Figure 9:
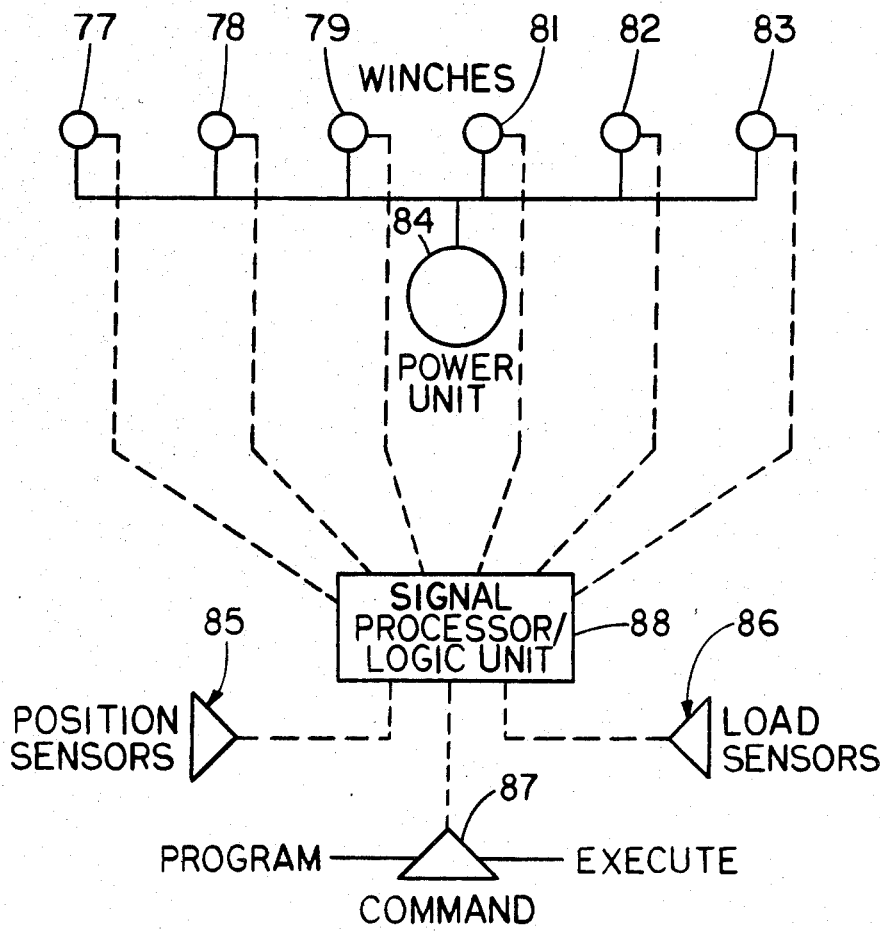
FIG. 9 is a schematic illustration of a control system for this invention.

FIG. 9 shows such a system. Winches 77 through 83 control the taking in and paying out of the six ropes shown in the system of FIG. 8. Power is applied to the several winches from the power unit 84.

Position sensors indicated generally at 85 measure the effective length of each of the ropes, thus providing information for a complete geometrical description of the system in its actual state. Load sensors, indicated generally at 86, measure rope tension and stress levels in key structural elements.

A command center 87 permits the operator to indicate the desired movement, preferably by a simple analog type control.

The signal processor/logic unit 88 contains memory devices which would represent any operating constraints, such as geometrical limitations and safe working stress levels. In addition, it would incorporate manual settings which would indicate what criteria were to be used in optimizing the motions.

A preferred mode of operation would be to provide the operator's commands with an initial program status as indicated. On receipt of a program command, the signal processor/logic unit would set up an optimal operating procedure consistent with the preset constraints, and would report a "clear to execute" signal to the operator. The operator would then implement the program by issuing the "execute" signal.

In the event that the desired program were inconsistent with the operating constraints, a signal to this effect would be made to the operator, indicating in what respect the program was unacceptable. At this time preferably the "execute" command circuit would be disabled.

Preferably, the system would include redundancy and would have facilities for manual override providing that the override command did not infringe safety considerations.

The particular control system utilized forms no part of this invention and any desired control system may be utilized to control the taking in and paying out of the several ropes. While they might be individually handled by an operator, as indicated above, such is not desirable and preferably a computerized system, such as suggested in FIG. 9 would be utilized.

Figure 10:
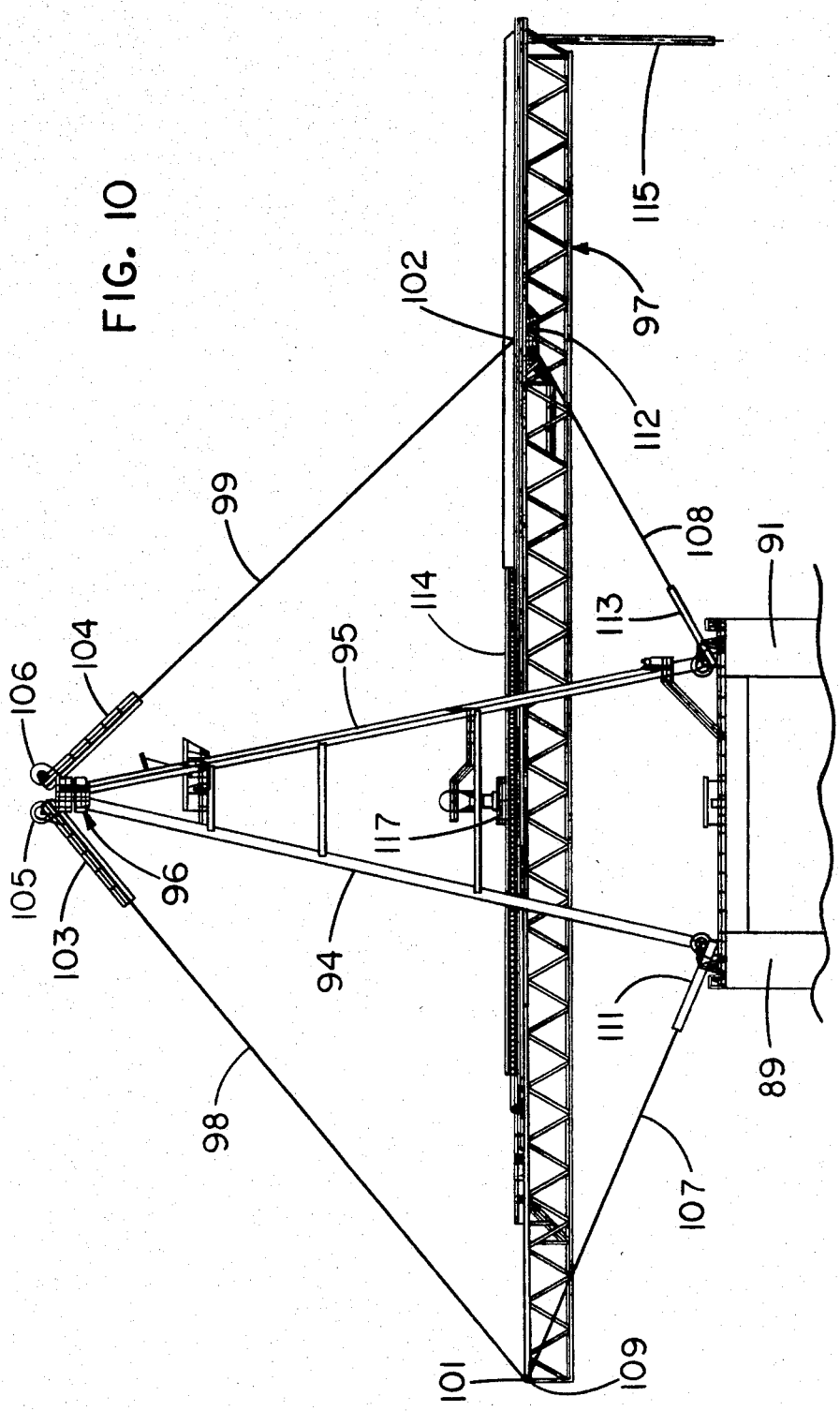
FIG. 10 is a side view of a transfer apparatus utilizing the principles illustrated in FIG. 8 in a transfer apparatus for transferring material from shore to a ship.
Figure 11:
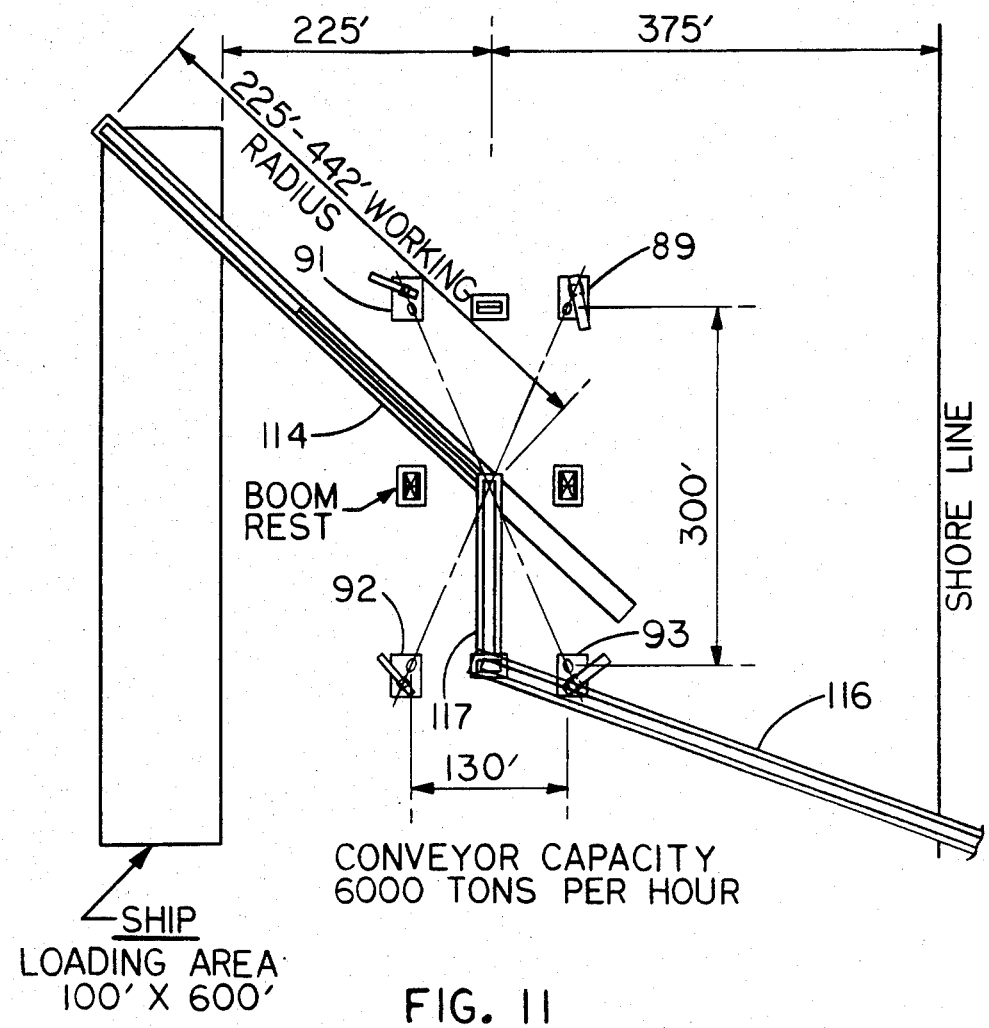
FIG. 11 is a plan view of the foundation and boom of FIG. 6 a and fixed conveyor system for delivering material to the boom and the ship loading area to be serviced by the boom.

In FIGS. 10 and 11 there is shown a material handling apparatus designed as illustrated in FIG. 8. Rectangularly arranged pilings 89, 91, 92 and 93 support a quadrapod elevated support means which includes the legs 94 and 95. A leg would be supported on each of the four pilings and the four legs would converge at the top and preferably be secured together by a large weldment joining the quadrapod legs adjacent each other with each leg slipping into a pocket in the weldment indicated generally at 96.

The boom indicated generally at 97 would be supported by a pair of ropes 98 and 99 with the rope 98 fixed to the boom at point 101 and the rope 99 fixed to the boom at point 102.

The ropes 98 and 99 would attach to the weldment 96 through the "Lucker" pulling system indicated generally at 103 and 104. Rope would be taken up and paid out by the reels 105 and 106 associated with the pulling system 103 and 104, respectively.

These "Lucker" pulling systems control taking in and paying out of the rope in a well known manner and are available from Lucker Manufacturing Company, 444 South Henderson Road, King of Prussia, Pennsylvania 19406.

Slewing of the boom 97 would be controlled by four ropes as taught in FIG. 8. Two of these ropes are shown in FIG. 10 at 107 and 108. The rope 107 is secured to the boom at 109 and is controlled by a "Lucker" pulling system 111.

The rope 108 is attached to the boom at 112 and is controlled by the "Lucker" pulling unit 113.

The boom carries a conveyor system 114 which delivers material to the chute 115 for transfer to a ship.

Material is received from the shore via a pair of conveyors 116 and 117. The discharge end of the conveyor 117 is fixed in space and the boom 97 is controlled to have a portion of the boom under this discharge point at all times. As shown in FIG. 11 the conveyor has a central section for receiving material as the boom is reciprocated longitudinally as needed to maintain the discharge end of the boom conveyor over the loading area. Preferably, the remainder of the conveyor is covered and provision is made to control dust during material transfer.

The material transfer system of FIGS. 10 and 11 might have the boom position controlled by any desired system such as that discussed in conjunction with FIG. 9.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A transfer apparatus comprising:
   elevated support means,
   a boom,
   at least two ropes extending between the support means and at least first and second longitudinally spaced points on the boom,
   at least two ropes extending between at least third and fourth longitudinally spaced points on the boom and anchor means spaced horizontally from said third and fourth points,
   at least one rope extending between a fifth point on the boom and anchor means spaced vertically from said fifth point,
   said boom being substantially completely suspended by said ropes and said ropes being arranged such that the elevation and axial movement of said boom being controlled by at least said ropes extending between said support means and said boom, slewing of said boom in the horizontal plane and luffing of said boom in the vertical plane being controlled by at least said ropes extending between said boom and said anchor means, and
   means for individually and simultaneously varying the length of all said ropes to enable the boom to move in the three perpendicular planes of the universe.

2. A transfer apparatus comprising:
   elevated support means,
   a boom,
   a first pair of ropes extending between said support means and first and second longitudinally spaced points on said boom,
   a second pair of ropes extending between third and fourth longitudinally spaced points on said boom and anchor points positioned laterally to one side of a plane passing through the first pair of ropes at their point of attachment to said support means,
   a third pair of ropes extending between fifth and sixth longitudinally spaced points on said boom and anchor points positioned laterally to the other side of said plane,
   said boom being substantially completely suspended by said ropes and said ropes being arranged such that the elevation and axial movement of said boom being controlled by at least said first pair of ropes, slewing of said boom in the horizontal plane and luffing of said boom in the vertical plane being controlled by at least said second and third pair of ropes, and
   means for individually and simultaneously varying the length of all said ropes to enable the boom to move in the three perpendicular planes of the universe.

3. A transfer apparatus comprising:
   elevated support means,
   a boom,
   a first pair of ropes extending between spaced points on said support means and points adjacent one end of said boom, a second pair of ropes extending between spaced points on said support means and points adjacent the other end of said boom, a fifth rope extending between the boom and an anchor point below the boom, said boom being substantially completely suspended by said ropes and said ropes being arranged such that the elevation, axial movement and slewing of said boom in the horizontal plane being substantially controlled by said first and second pairs of ropes, luffing of said boom in the vertical plane being substantially controlled by said fifth rope, and means for individually and simultaneously varying the length of all said ropes to enable the boom to move in the three perpendicular planes of the universe.

4. The apparatus of claim 3 wherein said first and second pairs of ropes are attached to said support means in approximately two parallel planes and said anchor point lies between said two planes.

5. The apparatus of claim 2 wherein said elevated support means includes at least two legs spaced apart at their lower end and the anchor points for said second pair of ropes lies adjacent one leg and the anchor points for said third pair of ropes lies adjacent the other leg.

6. The apparatus of claim 1, 2, 3, 4 or 5 wherein said support means is pivotally mounted on a boat for movement between an elevated position for use and a depressed position for transport.

7. The apparatus of claim 1, 2, 3, 4 or 5 wherein said support means is pivotally mounted on a boat and comprises:

a first and second pair of legs pivoted together at their upper ends with the lower end of one leg pivoted to the boat and the lower end of the other leg slidable along the boat.

8. The apparatus of claim 2 wherein said elevated support means includes a quadrapod and one anchor point for each of said second and third pair of ropes is adjacent one of the legs of said quadrapod.

9. The apparatus of claim 1, 2, 3, 4 or 5 wherein first conveyor means is provided on said boom, and second conveyor means extends to a point above said first conveyor means for transferring material to said first conveyor.

10. The apparatus of claim 1, 2, 3, 4 or 5 wherein a lifting rope is carried by said boom and is wound on the drum of a drawworks.

11. The method of suspending and controlling a boom comprising, supporting a boom from elevated support means and individually and simultaneously controlling extension and retraction of at least five operable ropes attached at longitudinally spaced points along the boom axis, thereby enabling the boom to slew, luff, elevate and move axially in the three perpendicular planes of the universe by taking in and paying out said ropes, and said boom being substantially completely suspended by said ropes.

12. The method of claim 11 wherein, five ropes are employed with one extending between the boom and an anchor point and four ropes extending between the boom and support means.

13. The method of claim 11 wherein, six ropes are employed with two ropes extending between the boom and support means and four ropes extending between the boom and spaced apart anchor points.

14. The method of claim 11, 12, or 13 wherein material is transferred by a line carried by the boom.

15. The method of claim 11, 12 or 13 wherein material is transferred by a conveyor carried by the boom.

16. The apparatus of claim 10 wherein said ropes are always under tension.

* * * * *